US012610062B2

(12) United States Patent　　　　　　(10) Patent No.:　US 12,610,062 B2

Sodagar　　　　　　　　　　　　　　　　(45) Date of Patent:　　Apr. 21, 2026

(54) METHOD FOR SIGNALING PICTURE IN PICTURE USING PRESELECTION WITH EXTERNAL BITSTREAM MANIPULATION INSTRUCTIONS

(71) Applicant: Tencent America LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/767,475

(22) Filed: Jul. 9, 2024

(65) Prior Publication Data

US 2025/0024047 A1　　　Jan. 16, 2025

Related U.S. Application Data

(60) Provisional application No. 63/526,140, filed on Jul. 11, 2023, provisional application No. 63/526,145, filed on Jul. 11, 2023.

(51) Int. Cl.
| | |
|---|---|
| *H04N 19/167* | (2014.01) |
| *H04N 19/115* | (2014.01) |
| *H04N 19/184* | (2014.01) |
| *H04N 19/44* | (2014.01) |

(52) U.S. Cl.
CPC ......... *H04N 19/167* (2014.11); *H04N 19/115* (2014.11); *H04N 19/184* (2014.11); *H04N 19/44* (2014.11)

(58) Field of Classification Search
CPC .. H04N 19/115; H04N 19/167; H04N 19/184; H04N 19/44
See application file for complete search history.

(56) References Cited

U.S. PATENT DOCUMENTS

| | | | |
|---|---|---|---|
| 2005/0123283 A1* | 6/2005 | Li | H04N 19/44 386/259 |
| 2019/0020880 A1* | 1/2019 | Wang | H04L 65/612 |
| 2023/0007210 A1* | 1/2023 | Wang | H04N 21/2353 |
| 2024/0236165 A1 | 7/2024 | Sodagar | |
| 2024/0284000 A1* | 8/2024 | Schreiner | H04N 21/44008 |

FOREIGN PATENT DOCUMENTS

WO　　　　2023275013 A1　　1/2023

OTHER PUBLICATIONS

"Technologies under Consideration for Dynamic Adaptive Streaming over HTTP 23009, Parts 1, 3, 4, 5, 6 and 8", Output Document ISO/IEC JTC 1/SC 29/WG 03 MPEG Systems, Apr. 28, 2023.*

(Continued)

*Primary Examiner* — Shahan Ur Rahaman

(74) *Attorney, Agent, or Firm* — Sughrue Mion, PLLC

(57)　　　　　　　ABSTRACT

A method includes receiving a Dynamic Adaptive Streaming over HTTP (DASH) bitstream; determining that the DASH bitstream includes a preselection element for multiplexing a plurality of media segments included in the DASH bitstream; parsing the plurality of media segments from the bitstream; multiplexing, by a DASH application, the plurality of segments using the preselection element and one or more policies associated with the decoder to generate a multiplexed bitstream; and outputting the multiplexed bitstream.

8 Claims, 5 Drawing Sheets

(56)         References Cited

OTHER PUBLICATIONS

"Text of ISO/IEC 23009-1 5th edition CDAM 2 EDRAP streaming, content steering and other extensions", marked up version, ISO/IEC JTC 1/SC 29/WG 03 N0780, 2023, 38 pages.
"Text of ISO/IEC 23009-1 5th edition CDAM 2 EDRAP streaming, content steering and other extensions", clean version, ISO/IEC JTC 1/SC 29/WG 03 N0780, 2023, 38 pages.
International Search Report (PCT/ISA/210) dated Sep. 26, 2024 issued by the International Searching Authority in International Application No. PCT/US2024/037510.
Written Opinion (PCT/ISA/237) dated Sep. 26, 2024 issued by the International Searching Authority in International Application No. PCT/US2024/037510.

* cited by examiner

200

METHOD FOR SIGNALING PICTURE IN PICTURE USING PRESELECTION WITH EXTERNAL BITSTREAM MANIPULATION INSTRUCTIONS

CROSS-REFERENCE TO RELATED APPLICATION

This application claims priority from U.S. Provisional Application No. 63/526,145, filed on Jul. 11, 2023 and U.S. Provisional Application No. 63/526,140, filed on Jul. 11, 2023, in the United States Patent and Trademark Office, the disclosures of each of which are incorporated herein by reference in their entirety.

FIELD

The disclosure generally relates signaling multiplexing instructions using a preselection element with external bitstream manipulation instructions.

BACKGROUND

The preselection element is defined in Dynamic Adaptive Streaming over HTTP (DASH) for providing media experiences by combining multiple streams. The current preselection design defines a set of specific methods for multiplexing the received streams before providing them to the decoder(s).

MPEG DASH provides a standard for streaming multimedia content over IP networks. The DASH standard provides a way to describe various content and their relation, using the preselection element. However, the current preselection design defines a set of specific and explicit methods for multiplexing the received streams before providing them to the decoder(s). Since each codec specification may require a different way of manipulation and multiplexing of the multiple streams, with the introduction of each new codec, its method(s) need to be included in the DASH standard, and that limits the extensibility and usability of the DASH specification.

The DASH CDAM2 document is developing a picture-in-picture signaling using preselection. However it includes explicit signaling for subpicture substitution.

While the DASH standard provides a way to describe various content and their relation, it does not provide an interoperable solution to annotate the VVC subpictures to be used for picture-in-picture applications. Picture-in-picture has many applications, from viewing an alternative channel at the same time as viewing the main channel to adding a sign video for the hearing-impaired audience that a small video on the corner of the main video shows a person conveying the audio information using the sign language.

SUMMARY

According to an aspect of the disclosure, a method performed by at least one processor of a decode comprises: receiving a Dynamic Adaptive Streaming over HTTP (DASH) bitstream; determining that the DASH bitstream comprises a preselection element for multiplexing a plurality of media segments included in the DASH bitstream; parsing the plurality of media segments from the bitstream; multiplexing, by a DASH application, the plurality of segments using the preselection element and one or more policies associated with the decoder to generate a multiplexed bitstream; and outputting the multiplexed bitstream.

According to an aspect of the disclosure, a decoder comprises: at least one memory configured to store program code; and at least one processor configured to read the program code and operate as instructed by the program code, the program code comprising: receiving code configured to cause the at least one processor to receive a Dynamic Adaptive Streaming over HTTP (DASH) bitstream; first determining code configured to cause the at least one processor to determine that the DASH bitstream comprises a preselection element for multiplexing a plurality of media segments included in the DASH bitstream; parsing code configured to cause the at least one processor to parse the plurality of media segments from the bitstream; multiplexing code configured to cause the at least one processor to multiplex, by a DASH application, the plurality of segments using the preselection element and one or more policies associated with the decoder to generate a multiplexed bitstream; and outputting code configured to cause the at least one processor to output the multiplexed bitstream.

According to an aspect of the disclosure, a method performed by at least one processor in a decoder comprises processing a Dynamic Adaptive Streaming over HTTP (DASH) bitstream; wherein the DASH bitstream comprises a preselection element for multiplexing a plurality of media segments included in the DASH bitstream, wherein the plurality of media segments are parsed from the bitstream, and wherein a DASH application multiplexes the plurality of segments using the preselection element and one or more policies associated with the decoder to generate a multiplexed bitstream.

Additional embodiments will be set forth in the description that follows and, in part, will be apparent from the description, and/or may be learned by practice of the presented embodiments of the disclosure.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
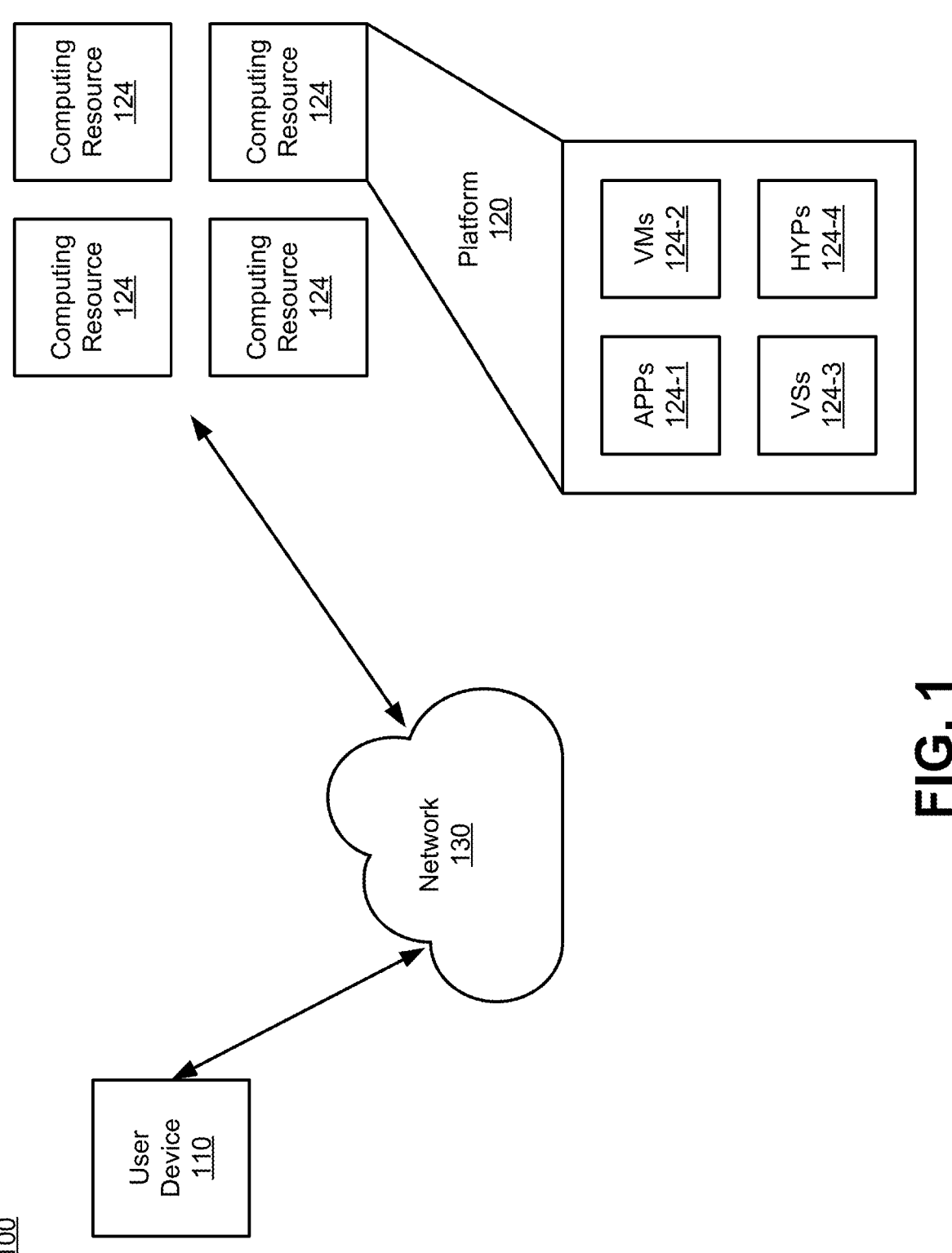
FIG. 1 is a diagram of an environment in which methods, apparatuses, and systems described herein may be implemented, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Embodiments of the present disclosure provide an extensible method of signaling stream manipulation and multiplexing in DASH preselection. The embodiments of the present disclosure further provide a method for signaling picture in picture experience using the preselection, but allowing the codec to define the bitstream manipulation and multiplexing instructions.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment

100 may perform one or more functions described as being performed by another set of devices of the environment 100.

Figure 2:
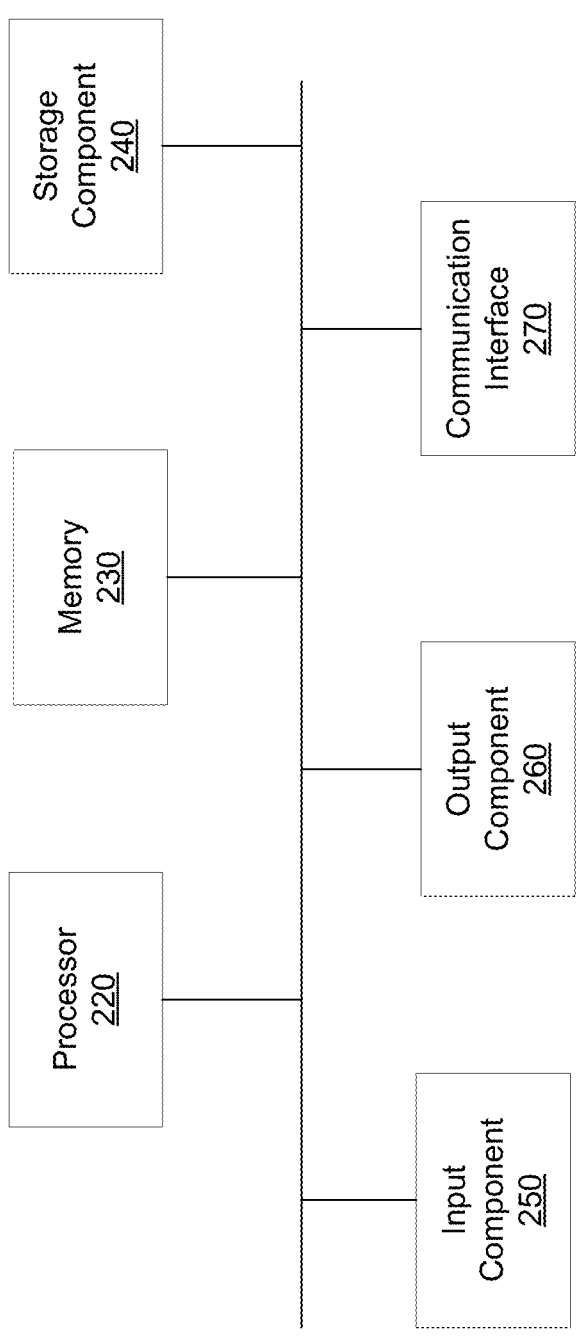
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
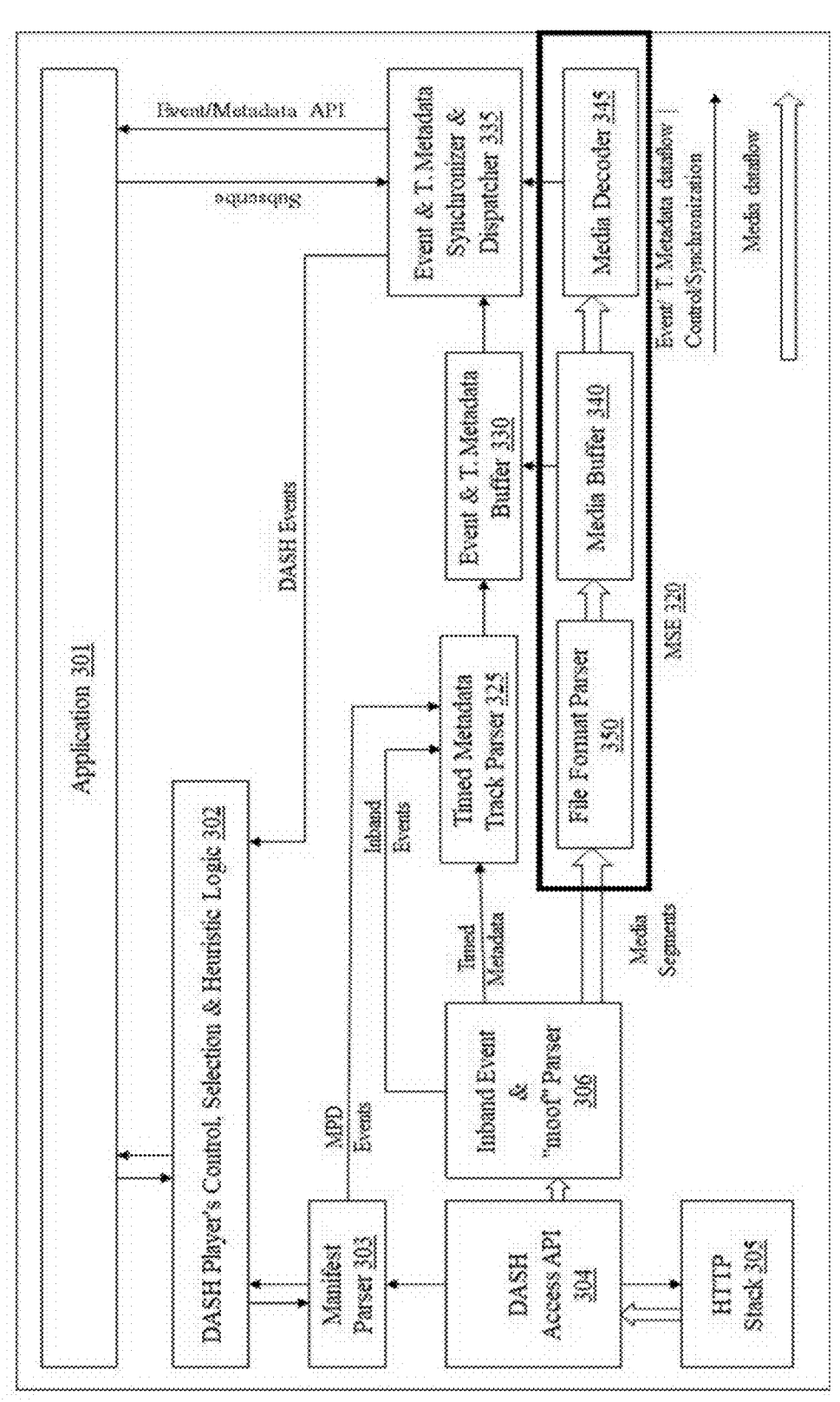
FIG. 3 is a diagram of an example client architecture for processing DASH and CMAF events, according to embodiments.

FIG. 3 shows a sample DASH processing model 300, such as of a sample client architecture for processing DASH and CMAF events. In the DASH processing model 300, a client's request of media segments (e.g., ad media segments and live media segments) may be based on described addresses in a manifest 303. The manifest 303 also describes metadata tracks from which a client may access segments of metadata tracks, parse them, and send them to an application 301.

The manifest 303 includes MPD events or events, and an inband event and 'moof' parser 306 may parse MPD event segments or event segments and append the event segments to an event and metadata buffer 330. The inband event and 'moof' parser 306 may also fetch and append the media segments to a media buffer 340. The event and metadata buffer 330 may send event and metadata information to an event and metadata synchronizer and dispatcher 335. The event and metadata synchronizer and dispatcher 335 may dispatch specific events to DASH players control, selection, and heuristic logic 302 and application related events and metadata tracks to application 301.

According to some embodiments, a MSE may include a pipeline including a file format parser 350, the media buffer 340, and a media decoder 345. MSE 320 is a logical buffer(s) of media segments, where the media segments may be tracked and ordered based on the media segments' presentation time. Media segments may include but may not be limited to ad media segments associated with ad MPDs and live media segments associated with live MPDs. Each media segment may be added or appended to the media buffer 340 based on the media segments' timestamp offset, and the timestamp offset may be used to order the media segments in the media buffer 340.

Since embodiments of the present application may be directed to building a linear media source extension (MSE) buffer from two or more nonlinear media sources using MPD chaining, and the nonlinear media sources may be ad MPDs and live MPDs, the file format parser 350 may be used to process the different media and/or codecs used by the live media segments included in the live MPDs. In some embodiments, the file format parser may issue a change type based on a codec, profile, and/or level of the live media segments.

As long as media segments exist in the media buffer 340, the event and metadata buffer 330 maintains corresponding event segments and metadata. The sample DASH processing model 300 may include a timed metadata track parser 325 to keep track of the metadata associated with the inband and MPD events. According to FIG. 3, the MSE 320 includes only the file format parser 350, the media buffer 340, and the media decoder 345. The event and metadata buffer 330 and event and metadata synchronizer and dispatcher 335 are not native to the MSE 320, inhibiting the MSE 320 from natively processing events and sending them to the application.

The semantics of the DASH preselection element is shown in Table 1.

TABLE 1

| Element or Attribute Name Preselection | Use | Description |
|---|---|---|
| @id | OD default = 1 | specifies the id of the Preselection. This shall be unique within one Period. |
| @preselectionComponents | M | specifies the ids of the contained Adaptation Sets or Content Components that belong to this Preselection as white space separated list in processing order. The first id defines the Main Adaptation Set. |
| @lang | O | same semantics for @lang attribute. |
| @order | OD Default: 'undefined' | specifies the conformance rules for Representations in Adaptation Sets within the Preselection. When set to 'undefined', the Preselection follows the conformance rules for Multi-Segment Tracks. When set to 'time-ordered', the Preselection follows the conformance rules for Time-Ordered Segment Tracks. When set to 'fully-ordered', the Preselection follows the conformance rules for Fully-Ordered Segment Tracks. In this case, order in the @preselectionComponents attribute specifies the component order. |

TABLE 1-continued

| Element or Attribute Name Preselection | Use | Description |
|---|---|---|
| Accessibility | 0 . . . N | specifies information about accessibility scheme. |
| Role | 0 . . . N | specifies information on role annotation scheme. |
| Rating | 0 . . . N | specifies information on rating scheme. |
| Viewpoint | 0 . . . N | specifies information on viewpoint annotation scheme. |
| CommonAttributesElements | — | specifies the common attributes and elements (attributes and elements from base type RepresentationBaseType). |

Key
For attributes:
M = mandatory,
O = Optional,
OD = optional with default value,
CM = conditionally mandatory
For elements: <minOccurs> . . . <maxOccurs> (N = unbounded)
Elements are bold; attributes are non-bold and preceded with an @.

As is shown in the above table, the attribute @order defines very specific multiplexing schemes and each time as new scheme is needed, a new value need to be added to the specification along with the conformance rules for multiplexing of the streaming for that value.

According to one or more embodiments, a new attribute for preselection, referred to as interleaving, is provided as indicated in Table 2.

TABLE 2

| Element or Attribute Name Preselection | Use | Description |
|---|---|---|
| @id | OD default = 1 | specifies the id of the Preselection. This shall be unique within one Period. |
| @preselectionComponents | M | specifies the ids of the contained Adaptation Sets or Content Components that belong to this Preselection as white space separated list in processing order. The first id defines the Main Adaptation Set. |
| @lang | O | same semantics as @lang attribute. |
| @order | OD Default: 'undefined' | specifies the conformance rules for Representations in Adaptation Sets within the Preselection. When set to 'undefined', the Preselection follows the conformance rules for Multi-Segment Tracks. When set to 'time-ordered', the Preselection follows the conformance rules for Time-Ordered Segment Tracks. When set to 'fully-ordered', the Preselection follows the conformance rules for Fully-Ordered Segment Tracks. In this case, order in the @preselectionComponents attribute specifies the component order. |

TABLE 2-continued

| Element or Attribute Name<br>Preselection | Use | Description |
|---|---|---|
| @interleaving | O | provides the interleaving instructions to be used for interleaving samples or groups of samples of this representation with other representations in this preselection. The syntax, semantics, and the conformance rules are defined by a decoder specification or related documents. the conformance rules for Representations in Adaptation Sets within the Preselection. The information provided in this attribute supersede @order value. |
| Accessibility | 0 . . . N | specifies information about accessibility scheme. |
| Role | 0 . . . N | specifies information on role annotation scheme. |
| Rating | 0 . . . N | specifies information on rating scheme. |
| Viewpoint | 0 . . . N | specifies information on viewpoint annotation scheme. |
| CommonAttributesElements | — | specifies the common attributes and elements (attributes and elements from base type RepresentationBaseType). |

Key
For attributes:
M = mandatory,
O = Optional,
OD = optional with default value,
CM = conditionally mandatory
For elements: <minOccurs> . . . <maxOccurs> (N = unbounded)
Elements are bold; attributes are non-bold and preceded with an @.

The new attribute in Table 2 is shown in underlining. As shown in Table 2, the @interleaving attribute is an opaque attribute, e.g., the content of this attribute is not defined by the DASH spec. The syntax and semantics of its content is defined by the decoder specs or related specs that are used in the adaptation set or content component element of the preselection. Therefore, the job of the DASH client is to provide @interleaving information to the DASH application, and the DASH application uses the information to manipulate and multiplex the received segment/subsegments.

Since the syntax and semantic of the interleaving is defined by the external specs, this attribute is future extensible, meaning any new decoder specification can define one or more interleaving schemes, syntax and semantic and since the application streaming those stream have the knowledge of the decoders, it should understand the interleaving instruction and conformance rules. Therefore, based on the embodiments of the present disclosure, the DASH specification is not tied to any specific codec.

Table 3 illustrates an alternative way of signaling the interleaving information to include the interleaving information as an option in @order.

TABLE 3

| Element or Attribute Name<br>Preselection | Use | Description |
|---|---|---|
| @id | OD<br>default = 1 | specifies the id of the Preselection. This shall be unique within one Period. |
| @preselectionComponents | M | specifies the ids of the contained Adaptation Sets or Content Components that belong to this Preselection as white space separated list in processing order. The first id defines the Main Adaptation Set. |

TABLE 3-continued

| Element or Attribute Name Preselection | Use | Description |
|---|---|---|
| @lang | O | same semantics as @lang attribute. |
| @order | OD Default: 'undefined' | specifies the conformance rules for Representations in Adaptation Sets within the Preselection. When set to 'undefined', the Preselection follows the conformance rules for Multi-Segment Tracks. When set to 'time-ordered', the Preselection follows the conformance rules for Time-Ordered Segment Tracks. When set to 'fully-ordered', the Preselection follows the conformance rules for Fully-Ordered Segment Tracks. In this case, order in the @preselectionComponents attribute specifies the component order. When set to a string that starts with substring 'opaque' and a white-space, the syntax and semantic of the rest of the @order string is not defined. The DASH client pass the @order value to the Application. The Application uses this value to manipulate and multiplex the received (sub)segment. The syntax, semantics, and the conformance rules are defined by a decoder specification or related documents. |
| Accessibility | 0 . . . N | specifies information about accessibility scheme. |
| Role | 0 . . . N | specifies information on role annotation scheme. |
| Rating | 0 . . . N | specifies information on rating scheme. |
| Viewpoint | 0 . . . N | specifies information on viewpoint annotation scheme. |
| CommonAttributesElements | — | specifies the common attributes and elements (attributes and elements from base type RepresentationBaseType). |

Key
For attributes:
M = mandatory,
O = Optional,
OD = optional with default value,
CM = conditionally mandatory
For elements: <minOccurs> . . . <maxOccurs> (N = unbounded)
Elements are bold; attributes are non-bold and preceded with an @.

As is shown in Table 3, the @order has a new value. According to one or more embodiments, if the @order value starts with the substring "opaque", the rest of @order value provides the information about multiplexing and manipulation of the received (sub) segments. In one or more examples, the syntax and semantic are defined by the decoder(s) specifications and is out of scope of the DASH specification.

The embodiments of the present disclosure further provide an alternative method that allows flexible bitstream manipulation independent from the DASH specification for picture-in-picture.

Figure 4:
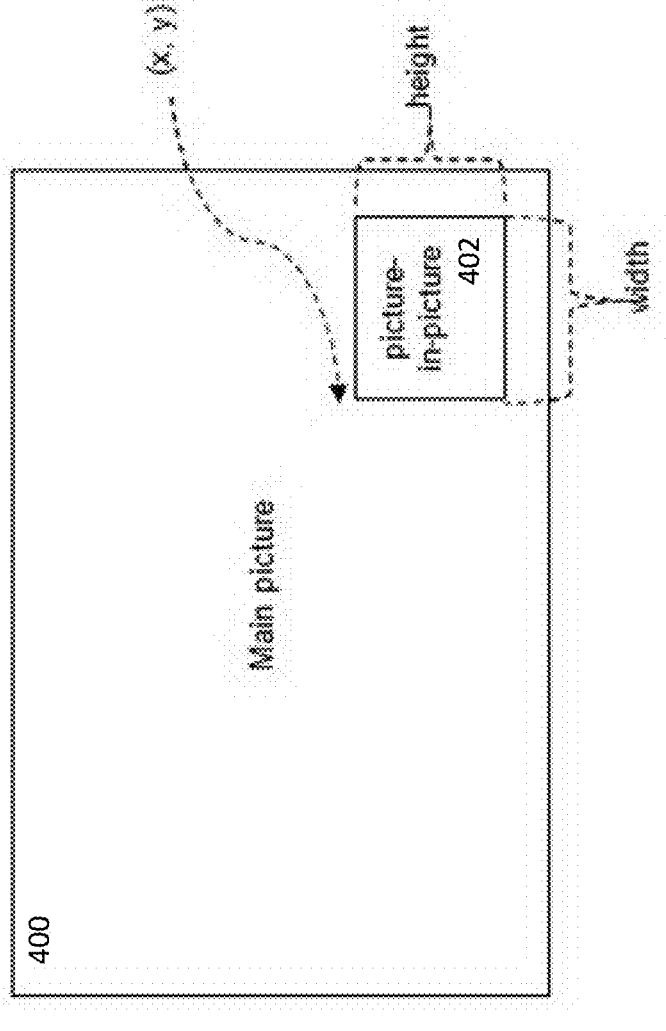
FIG. 4 is an example picture-in-picture diagram, according to embodiments.

FIG. 4 illustrates an example picture-in-picture use case. As shown in this figure, the main picture 400 may take the entire screen while the overlay picture 402 may take a small area of the screen, covering the corresponding area of the main picture. The coordinate of the picture-in-picture (pip) may be indicated by x, y, height, and width, where these parameters define the location and size of the pip relative to the main picture coordinate correspondingly.

In the case of streaming, the main video and the pip video may be delivered as two separate streams. If there are independent streams, the main video and the PiP video are decoded by separate decoders and then are composed together for rendering. If the used video codec supports merging the streams, the pip video stream is combined with the main video stream, possibly replacing the streaming that represents the covered area of the main video with the pip video, and then the single stream is sent to the decoder for decoding and then rendering.

The DASH CDAM2 provides the following solution for picture-in-picture signaling.

In one or more examples, a SupplementalProperty element with the @schemeIdUri attribute equal to urn: mpeg: dash: pinp: 2022 is referred to as a picture-in-picture (PiP) descriptor. In one or more examples, one PiP descriptor may be present at Preselection level. The presence of a PiP descriptor in a Preselection indicates that the purpose of the Preselection is for providing a PiP experience.

In one or more examples, PiP services offer the ability to include a video with a smaller spatial resolution within a video with a bigger spatial resolution. In this case, the different bitstreams/Representations of the main video are included in the Main Adaptation Set of the Preselection, and the different bitstreams/Representations of a supplementary video, also referred to as PiP video, are included a Partial Adaptation Set of the Preselection. When a PiP descriptor is present in a Preselection, and the picInPicInfo@dataUnitsReplacable attribute is present and equal to 'true', the client may choose to replace the coded video data units representing the target PiP region in the main video with the corresponding coded video data units of the PiP video before sending to the video decoder. This way, separate decoding of the main video and the PiP video can be avoided. For a particular picture in the main video, the corresponding video data units of the PiP video are all the coded video data units in the decoding-time-synchronized sample in the supplemental video Representation.

The @value attribute of the PiP descriptor shall not be present. The PiP descriptor may include a picInPicInfo element with its attributes as specified in Table 4.

In one or more examples, the XML syntax of the PicIm-picInfo element may be specified as follows:

```
<xs:complexType name="PicInpicInfoType">
  <xs:annotation>
    <xs:documentation xml:lang="en">
      Picnpic
  </xs:documentation>
</xs:annotation>
  <xs:attribute name="dataUnitReplacable" type="xs:boolean"
  default="false" />
  <xs:attribute name="regionIds" type="StringNoWhitespaceType"/>
  <xs:anyAttribute namespace="##other" processContents="lax"/>
</xs:complexType>
```

In one or more examples, an alternative solution for picture-in-picture support in DASH is to use the 'pip' value for Role, as well as to use ContentComponent along with Role and @tag to signal the subpicture IDs or any other IDs needed.

In one or more examples the manipulation of the stream and the composition may specified by a specification for the decoder and not the dash client. In one or more examples, the dash client provides the content properties and metadata to the DASH Application, where it is the DASH Application's job to do any bitstream manipulation, location of PiP, and rendering.

As is shown in the above, the preselection element may be used, but a new element inside preselection, PicInpicInfo,to signal the bitstream manipulation is needed by replacing one or more subpictures streams of the main video with the picture-in-picture video coded stream. Such operation is very specific to a video decoder and cannot be generalized to other bitstream manipulation and multiplexing.

According to one or more embodiments, instead of providing the multiplexing information explicitly, the preselection's interleaving attribute, or order attribute, may be used

TABLE 4

| Element or Attribute Name PicInpicInfo | Use | Description |
|---|---|---|
| @dataUnitsReplacable | OD Default: 'false' | specifies whether the coded video data units representing the target PiP region in the main video can be replaced by the corresponding video data units of the PiP video. When @dataUnitsReplacable is equal to 'true', the client may choose to replace the coded video data units representing the target PiP region in the main video with the corresponding coded video data units of the PiP video before sending to the video decoder for decoding. |
| @regionIds | O | specifies the IDs of the coded video data units representing the target PiP region, as a white space separated list. When @dataUnitsReplacable is equal to 'false', this attribute shall not be present. The concrete semantics of the region IDs need to be explicitly specified for specific video codecs. |

Key
For attributes:
M = mandatory,
O = Optional,
OD = optional with default value,
CM = conditionally mandatory
For elements: <minOccurs> . . . <maxOccurs> (N = unbounded)
Elements are bold; attributes are non-bold and preceded with an @.

to provide the opaque information to the application regarding multiplexing. In one or more examples, the opaque information is transparent to the DASH client and decoder. In this case, the DASH client doesn't need to parse and understand the interleaving attribute content. In one or more examples, the DASH Application is responsible for the bitstream manipulation and multiplexing, and the instruction, syntax, and semantic are defined by the decoder(s) specification(s). Since the DASH Application is aware of the decoder it is using, the DASH application is able understand the opaque instructions provided by the DASH client.

According to one or more embodiments, a new value is added to the DASH Role scheme. The value "pip" may indicate that the preselection element is used for the picture-in-picture experience. Example semantics of the "pip" value are shown in Table 5.

In one or more examples, alternate media content components may be expected to carry other descriptors to indicate in what way it differs from the main media content components (e.g. a Viewpoint descriptor or a Role descriptor), especially when multiple alternate media content components including multiple supplementary media content components are available.

In one or more examples, open ("burned in") captions or subtitles may be marked as media type component "video" only, but having a descriptor saying "caption" or "subtitle".

In one or more examples, role descriptors with values such as "subtitle,", "caption," "description," "sign," or "metadata" may be used to enable assignment of a "kind" value in HTML 5 applications for tracks exposed from a DASH MPD.

TABLE 5

| Role@value | Description | Applicable Media Type(s) (Informative) |
| --- | --- | --- |
| Caption | Captions | video, text |
| Subtitle | Subtitles | video, text |
| Main | Main media component(s) which is/are intended for presentation if no other information is provided. | Any |
| Alternate | Media content component(s) that is/are an alternative to (a) main media content component(s) of the same media component type. | Any |
| Supplementary | Media content component that is supplementary to a media content component of a different media component type | Any |
| Commentary | Experience that contains a commentary (e.g. director's commentary) (typically audio). | audio, text |
| Dub | Experience that contains an element that is presented in a different language from the original (e.g. dubbed audio, translated captions). | audio, text |
| Description | Textual or audio media component containing a textual description (intended for audio synthesis) or an audio description describing a visual component. | audio, text |
| Sign | Visual media component representing a sign-language interpretation of an audio component. | Video |
| Metadata | Media component containing information intended to be processed by application specific elements. | text, application |
| enhanced-audio-intelligibility | Experience containing an element for improved intelligibility of the dialogue. | Audio |
| Emergency | Experience that provides information, about a current emergency, that is intended to enable the protection of life, health, safety, and property, and may also include critical details regarding the emergency and how to respond to the emergency. | Any |
| forced-subtitle | Textual information meant for display when no other text representation is selected. It is used to clarify dialogue, alternate languages, texted graphics or location/person IDs that are not otherwise covered in the dubbed/localized audio. | Text |
| Easyreader | Simplified or reduced captions. | text, video |
| Karaoke | Textual representation of a songs' lyrics, usually in the same language as the associated song. | Any |
| Pip | The content suitable for a picture-in-picture experience. | Video |

The underlined row indicates the new value.

In one or more examples, a normal audio/video program labels both the primary audio and video as "main." However, when the two media component types are not equally important, for example (a) video providing a pleasant visual experience to accompany a music track that is the primary content or (b) ambient audio accompanying a video showing a live scene such as a sports event, that is the primary content, the accompanying media can be assigned a "supplementary" role.

In one or more examples, the preselection element may be used to describe a collection of adaptation sets in MPD suitable for a picture-in-picture (PiP) experience. PiP experience offers the ability to include a video with a smaller spatial resolution within a video with a bigger spatial resolution. In this case, the different bitstreams/Representations of the main video may be included in the Main Adaptation Set of the Preselection, and the different bitstreams/Representations of a supplementary video also referred to as PiP video, are included in a Partial Adaptation Set of the Preselection.

In one or more examples, the Preselection element indicating picture-in-picture presentation may include exactly one Role element in accordance with the role scheme and the value "pip". The presence of this descriptor with this value in a Preselection may indicate that the purpose of the Preselection is for providing a PiP experience.

In one or more examples, the Preselection@interleaving, if existing in a DASH bitstream, provides the instructions for the DASH Application to process the representation segments/subsegments before providing them to the decoder(s). In one or more examples, the syntax and semantics used in this attribute may be defined by the specifications and/or related documents that define the decoders used in Adaptation Sets. In one or more examples, Content Components belong to this Preselection by Preselection@ preselection-Components.

In one or more examples, in the case of VVC, the sub-pictures may be identified with a subpictures id. In one or more examples, the following syntax may be used for Preselection@interleaving:

subpic1 subpic2 . . . , where subpic1, subpic2, and . . . are space-separated subpicture ids of the VVC bitstream, each defining one subpicture and the group defining the overall region that can be used for the picture in picture overlay.

Figure 5:
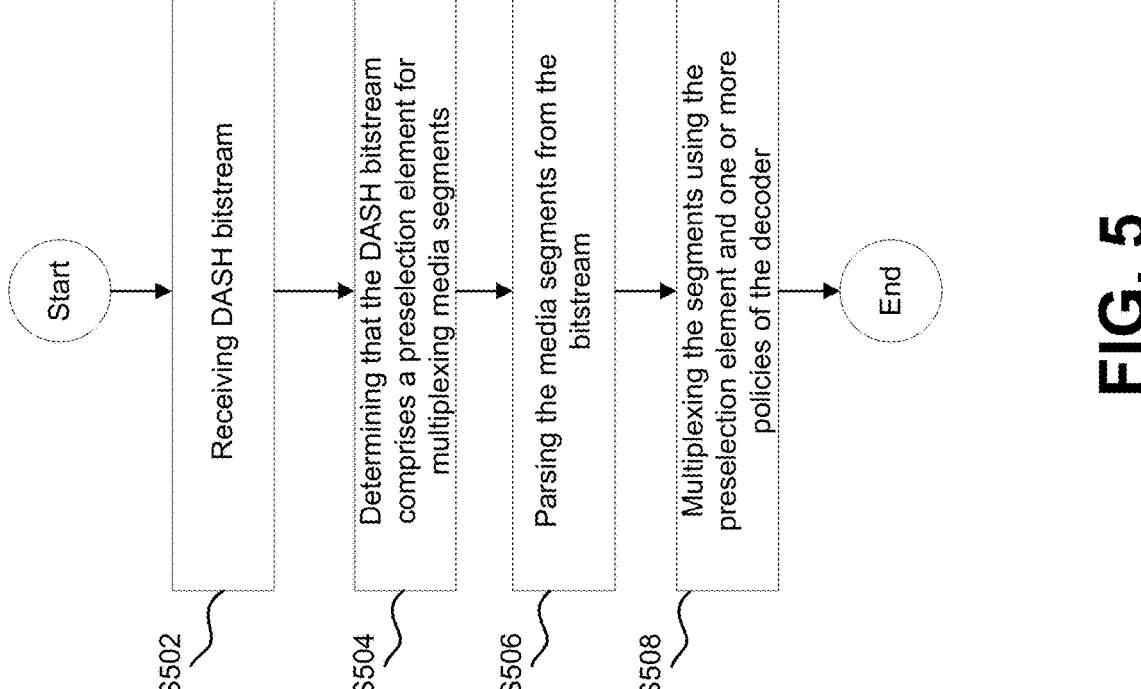
FIG. 5 is a flowchart of an example process for signaling multiplexing information, according to embodiments.

FIG. 5 illustrates an example process for signaling and processing multiplexing information in a DASH bitstream.

The process may start at operation S502 where a DASH bitstream is received. The DASH bitstream may include a plurality of media segments.

The process proceeds to operation S504 where it is determined that the DASH bitstream includes a preselection element for multiplexing media segments. The preselection element may be Preselection@interleaving, or Preselection@order having a predefined string value (e.g., "opaque").

The process proceeds to operation S506 where the media segments from the bitstream are parsed. For example, the multiplexing information for multiplexing media segments may specify two or more media segments to be multiplexed or interleaved, where these specified media segments are parsed from the bitstream.

The process proceeds to operation S508 where the media segments are multiplexed using the preselection element and one or more policies of the decoder.

According to one or more embodiments, a method includes: using a preselection for a picture-in-picture experience signaling, wherein an attribute is used to indicate multiplexing information and instructions to an application, wherein the multiplexing information and instructions are invisible to a DASH client, wherein the DASH application is capable of decoding the multiplexing information and instructions and applying corresponding multiplexings and manipulations to received media segments, thereby providing extensibility for multiplexing schemes without explicitly being defined by a DASH standard specification.

According to one or more embodiments, a method includes: making a DASH preselection element extensible for bitstream manipulation and multiplexing, wherein a new attribute is added to the DASH preselection element that carries bitstream manipulation and multiplexing information and instructions, wherein a corresponding syntax and semantic of the bitstream manipulation and multiplexing information is defined by an external specification of a decoder standard, wherein the specification of the decoder standard defines a set of syntaxes and semantics independent of DASH specification, and wherein the DASH specification includes instructions associated with the set of syntaxes and semantics to achieve extensibility in preselection bitstream manipulation and multiplexing.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method performed by at least one processor of a decoder, the method comprising:

receiving a Dynamic Adaptive Streaming over HTTP (DASH) bitstream;

determining that the DASH bitstream comprises a preselection element for multiplexing a plurality of media segments included in the DASH bitstream, the preselection element being preselection@interleaving that comprises one or more instructions for interleaving at least two media segments from the plurality of media segments, the preselection@intervleaving superseding a preselectionon@order element included in the DASH bitstream, the preselection@order specifying one or more conformance rules for representations in adaptation sets within a preselection element;

parsing the plurality of media segments from the bitstream;

multiplexing, by a DASH application, the plurality of segments using the preselection element and one or more policies associated with the decoder to generate a multiplexed bitstream; and outputting the multiplexed bitstream.

2. The method according to claim 1, further comprising: determining that the DASH bitstream comprises a role element having a value indicating that the multiplexed bitstream is picture-in-picture.

3. The method according to claim 2, wherein the role element is Role@pip.

4. The method according to claim 2, wherein the preselection element is preslection@interleaving, and wherein preselection@interleaving comprises one or more instructions for interleaving at least two media segments form the plurality of media segments to provide picture-in-picture in which a first media segment is a main picture and a second media segment is an overlay picture to be displayed within the main picture.

5. A decoder comprising:

at least one memory configured to store program code; and at least one processor configured to read the program code and operate as instructed by the program code, the program code comprising:

receiving code configured to cause the at least one processor to receive a Dynamic Adaptive Streaming over HTTP (DASH) bitstream;

first determining code configured to cause the at least one processor to determine that the DASH bitstream comprises a preselection element for multiplexing a plurality of media segments included in the DASH bitstream, the preselection element being preselection@interleaving that comprises one or more instructions for interleaving at least two media segments from the plurality of media segments, the preselection@intervleaving superseding a preselectionon@order element included in the DASH bitstream, the preselection@order specifying one or more conformance rules for representations in adaptation sets within a preselection element;

parsing code configured to cause the at least one processor to parse the plurality of media segments from the bitstream;

multiplexing code configured to cause the at least one processor to multiplex, by a DASH application, the plurality of segments using the preselection element and one or more policies associated with the decoder to generate a multiplexed bitstream; and outputting code configured to cause the at least one processor to output the multiplexed bitstream.

6. The decoder according to claim 5, further comprising:

second determining code configured to cause the at least one processor to determine that the DASH bitstream comprises a role element having a value indicating that the multiplexed bitstream is picture-in-picture.

7. The method according to claim 2, wherein the role element is Role@pip.

8. A method performed by at least one processor in a decoder, the method comprising:

processing a Dynamic Adaptive Streaming over HTTP (DASH) bitstream;

wherein the DASH bitstream comprises a preselection element for multiplexing a plurality of media segments included in the DASH bitstream, the preselection element being preselection@interleaving that comprises one or more instructions for interleaving at least two media segments from the plurality of media segments, the preselection@intervleaving supersedes a preselectionon@order element included in the DASH bitstream, the preselection@order specifying one or more conformance rules for representations in adaptation sets within a preselection element, wherein the plurality of media segments are parsed from the bitstream, and wherein a DASH application multiplexes the plurality of segments using the preselection element and one or more policies associated with the decoder to generate a multiplexed bitstream.

\* \* \* \* \*